United States Patent
Freitag et al.

(10) Patent No.: US 11,018,521 B2
(45) Date of Patent: May 25, 2021

(54) POWER AND DATA DISTRIBUTION MODULE AND METHOD FOR POWER AND DATA DISTRIBUTION IN AN AIRBORNE VEHICLE

(71) Applicant: Airbus Operations GmbH, Hamburg (DE)

(72) Inventors: Klaus-Udo Freitag, Hamburg (DE); Yener Palit, Hamburg (DE)

(73) Assignee: Airbus Operations GmbH

( * ) Notice: Subject to any disclaimer, the term of this patent is extended or adjusted under 35 U.S.C. 154(b) by 358 days.

(21) Appl. No.: 15/347,201

(22) Filed: Nov. 9, 2016

(65) Prior Publication Data
US 2017/0063151 A1 Mar. 2, 2017

Related U.S. Application Data

(63) Continuation of application No. PCT/EP2014/075920, filed on Nov. 28, 2014.

(30) Foreign Application Priority Data

May 15, 2014 (EP) .................................. 14168455

(51) Int. Cl.
*H02J 13/00* (2006.01)
*H02J 3/14* (2006.01)
(Continued)

(52) U.S. Cl.
CPC .......... *H02J 13/00007* (2020.01); *H02J 3/14* (2013.01); *H02J 4/00* (2013.01); *H02J 9/002* (2013.01);
(Continued)

(58) Field of Classification Search
CPC .. H02J 13/002; H02J 13/0062; H02J 13/0075; H02J 3/14; H02J 4/00;
(Continued)

(56) References Cited

U.S. PATENT DOCUMENTS 5,936,318 A 8/1999 Weiler et al.
6,664,656 B2 12/2003 Bernier
(Continued)

FOREIGN PATENT DOCUMENTS

CN 1204879 A 1/1999
EP 1 967 929 A2 9/2008
(Continued)

OTHER PUBLICATIONS

Written Opinion and Search Report PCT/EP2014/075920 dated Feb. 5, 2015.

*Primary Examiner* — Daniel Cavallari
*Assistant Examiner* — Brian K Baxter
(74) *Attorney, Agent, or Firm* — Lerner, David, Littenberg, Krumholz & Mentlik, LLP

(57) ABSTRACT

A power and data distribution module includes a plurality of first power supply interfaces, configured to be connected to a plurality of power supply lines, a data bus interface configured to be connected to a data bus, a plurality of power output interfaces, configured to be connected to an electrical load and to supply electrical power from a first power supply interfaces to the connected electrical loads, a plurality of voltage distribution modules coupled between the first power supply interfaces and the power output interfaces and configured to provide AC or DC voltage via the power output interfaces, a load shedding module configured to receive load shedding information via data communication over one or more power supply lines, and a data concentrator configured to receive redundant load shedding information via data communication over the data bus and to transmit the redundant load shedding information to the load shedding module.

14 Claims, 2 Drawing Sheets

(51) Int. Cl.
  *H02J 4/00* (2006.01)
  *H02J 9/00* (2006.01)
  *B64G 1/42* (2006.01)

(52) U.S. Cl.
  CPC ...... *H02J 13/0062* (2013.01); *H02J 13/0075* (2013.01); *B64D 2221/00* (2013.01); *B64G 1/428* (2013.01)

(58) Field of Classification Search
  CPC ............... H02J 9/002; H02J 13/00007; B64D 2221/00; B64G 1/428
  USPC ......................................................... 307/9.1
  See application file for complete search history.

(56) References Cited

U.S. PATENT DOCUMENTS

| | | | |
|---|---|---|---|
| 7,136,725 B1 | 11/2006 | Paciorek et al. | |
| 2003/0047997 A1* | 3/2003 | Bernier | B64D 41/00 307/9.1 |
| 2003/0208764 A1* | 11/2003 | Galipeau | H04N 7/17318 725/76 |
| 2005/0121978 A1* | 6/2005 | McAvoy | H02J 3/14 307/43 |
| 2006/0062143 A1 | 3/2006 | Bibby et al. | |
| 2008/0217471 A1* | 9/2008 | Liu | G05B 23/0213 244/1 R |
| 2008/0303353 A1* | 12/2008 | Yu | H02J 13/0003 307/131 |
| 2009/0167076 A1 | 7/2009 | Serventi et al. | |
| 2009/0282274 A1 | 11/2009 | Langgood et al. | |
| 2010/0148791 A1* | 6/2010 | Oldenburg | G01R 31/008 324/523 |
| 2011/0010018 A1 | 1/2011 | Haugh | |
| 2011/0221404 A1* | 9/2011 | Rozman | H02J 1/08 323/234 |
| 2012/0271475 A1 | 10/2012 | Wang et al. | |
| 2013/0149894 A1* | 6/2013 | Woydack | H04L 12/10 439/527 |
| 2013/0169036 A1 | 7/2013 | Todd et al. | |
| 2013/0207705 A1* | 8/2013 | Prabhuk | H02J 1/08 327/203 |
| 2013/0214597 A1* | 8/2013 | Malo | H02J 9/06 307/23 |
| 2014/0297155 A1* | 10/2014 | Chen | F02C 9/28 701/100 |
| 2015/0045978 A1* | 2/2015 | Yoshiguchi | H02J 3/14 700/295 |
| 2015/0225089 A1* | 8/2015 | Judge | B64D 43/00 701/3 |
| 2015/0311815 A1* | 10/2015 | Nedic | H02M 7/003 363/21.01 |
| 2016/0306417 A1* | 10/2016 | Greig | G06F 1/3296 |

FOREIGN PATENT DOCUMENTS

| | | |
|---|---|---|
| EP | 2 001 104 A2 | 12/2008 |
| EP | 2 595 014 A2 | 5/2013 |
| WO | 02/068253 A1 | 9/2002 |

* cited by examiner

POWER AND DATA DISTRIBUTION MODULE AND METHOD FOR POWER AND DATA DISTRIBUTION IN AN AIRBORNE VEHICLE

CROSS-REFERENCE TO RELATED APPLICATIONS

This application is a continuation of International Application No. PCT/EP2014/075920 filed Nov. 28, 2014, published on Nov. 19, 2015, which claims priority from European Patent Application No. 14168455.5 filed May 15, 2014, all of which are incorporated herein by reference.

FIELD OF THE INVENTION

The present invention relates to a power and data distribution module, particularly for use in aircraft or spacecraft, a power and data distribution network of an airborne vehicle, an airborne vehicle comprising a power and data distribution network and a method for power and data distribution in an airborne vehicle. The invention may be particularly useful for any type of vehicle where for reasons of security multiple electrical routes are desired, for example waterborne vehicles such as ships or submarines, groundborne vehicles such as trucks, busses or trains, and spaceships, starships, space stations or satellites.

Every new aircraft is primarily designed to satisfy the customer's needs. The design should support manufacturing needs and constraints, allowing fast ramp-ups and high load production. On the other hand, cost efficiency, simplicity of operation along with flexibility in terms of customization should be considered in the design phase.

BACKGROUND OF THE INVENTION

In contemporary power distribution networks of aircraft, power switching activities are performed mostly in electronic power distribution centers. This means that different load systems and different sheddable loads within the aircraft each need a separate power line from the power source up to the installed power consumer. Such network topology requires many different electrical routings and wirings within the aircraft. Moreover, conventional data communication systems within aircraft are usually individually routed for each different consumer or circuit.

The document US 2009/0167076 A1 discloses a system and a method for distribution of electric power inside an aircraft. The system includes at least two systems distributing electric power from at least one power source to electric loads of the aircraft via electric and/or electronic protection/switching components, the components being configurable and commandable by dedicated electronics. Each electric distribution system includes command electronics in which a configuration file is downloaded allocating an installation status to each of the protection/switching components.

The document U.S. Pat. No. 6,664,656 B2 discloses a data collection network and electrical power distribution network designed to reduce airplane wire weight and to allow nearly complete wiring design and installation of wiring and equipment in the major structural sections of the airplane.

The document US 2013/0169036 A1 discloses an aircraft power distribution network comprising first and second galvanically isolated power bus bars, and first and second remote data concentrators (RDCs), each RDC having an input/output interface (I/O) and a power supply, the first RDC power supply being connected to the first power bus bar, the second RDC power supply being connected to the second power bus bar, an input/output device being connected to the I/O of the first RDC and to the I/O of the second RDC, each RDC being adapted to supply electrical power to the input/output device through its respective I/O, wherein each RDC includes a switch for isolating the input/output device, and the switches being operatively coupled such that electrical power cannot be supplied to the input/output device by both RDCs simultaneously.

The document CN 1204879 A discloses a power distribution arrangement, especially in an aircraft, includes plural power sources, a power line having plural power supply strands connected to the power sources, plural power consumer groups each including plural power consuming devices, and branch lines respectively connecting the power line with the power consumer groups. A respective allocation unit selectively interconnects the power consuming devices of each group with selected individual branch line strands of the branch lines. A status unit acquires information regarding the respective operating status of the power sources and the power line strands, and conveys corresponding information regarding a power failure on any power line strand to a central power control unit, which correspondingly transmits control commands over a control bus to the respective allocation units. In response to the control commands, each allocation unit automatically disconnects power consuming devices from any power line strand that has failed and reconnects the devices to another power line strand that is still operating properly.

BRIEF SUMMARY OF THE INVENTION

One of the ideas of the invention is thus to provide solutions for decentralized power shedding that take into consideration the different power needs of different electrical loads/consumers.

A first aspect of the disclosure pertains to a power and data distribution module, particularly in an aircraft or spacecraft, comprising a plurality of first power supply interfaces, each configured to be connected to a plurality of power supply lines, a data bus interface configured to be connected to a data bus, a plurality of power output interfaces, each configured to be connected to one or more electrical loads and to supply electrical power from one of the first power supply interfaces to the connected electrical loads, a plurality of voltage distribution modules coupled between the plurality of first power supply interfaces and the plurality of power output interfaces and configured to provide AC or DC voltage via the power output interfaces, a load shedding module configured to receive load shedding information via data communication over one or more of the plurality of power supply lines, and a data concentrator configured to receive redundant load shedding information via data communication over the data bus and to transmit the redundant load shedding information to the load shedding module, wherein the load shedding module is further configured to shed one or more electrical loads connected to the plurality of power output interfaces depending on the received load shedding information and the received redundant load shedding information.

According to a second aspect of the disclosure, a power and data distribution network comprises a plurality of PADD modules according to the first aspect of the disclosure, at least one electrical power distribution center coupled to the plurality of PADD modules via one or more of the first power supply interfaces, and a data communication director coupled the plurality of PADD modules via the data bus interface.

According to a third aspect of the disclosure, a method for power and data distribution in an airborne vehicle comprises generating electrical power in at least one electrical power distribution center, distributing the generated electrical power via one or more power supply lines to a plurality of PADD modules, receiving load shedding information at the plurality of PADD modules via data communication over one or more of the plurality of power supply lines, receiving redundant load shedding information at the plurality of PADD modules via data communication over a data bus, transmitting the redundant load shedding information in the plurality of PADD modules to the load shedding module, and shedding one or more electrical loads connected to power output interfaces of the PADD modules depending on the received load shedding information and the received redundant load shedding information.

According to a fourth aspect of the disclosure, an airborne vehicle comprises a power and data distribution network in line with the second aspect of the disclosure.

One of the key findings for the present invention is the development of a common power and data infrastructure of cabin power and data distribution for all cabin and cargo essential and non-essential modules and systems. The power and data distribution modules of the present disclosure may be employed as decentralised platforms for data and electrical power distribution for all linked cabin and cargo equipment, modules and systems.

It will advantageously serve as selective electrical load shedding, voltage transforming, overvoltage and overcurrent protection and switching-on-demand device. Additionally, the power and data distribution modules of the present disclosure operate as data transformers and/or transmission providers as well as functional hosts to all functions within cabin and cargo areas of an airborne vehicle.

The power and data distribution network of the present disclosure takes into account additional requirements based on particular risks, such as engine bursts or hydraulic accumulator bursts, without requiring different redundant routings for each relevant different system, such as oxygen distribution, smoke detection and emergency lighting. It relies on a universal data bus concept with combined data over power, wireless, optical data transmission and wirebound data communication in one unit.

The power and data distribution network of the present disclosure advantageously allows for elimination of power supply line wiring, communication via a high speed data bus and reduction of interface connectors. Moreover, the power and data distribution network of the present disclosure provides decentralised shedding functionality of selective loads, load groups or single consumers that are advantageously communicated redundantly via data over power (DOP), wireless data transmission and/or high speed cabin data bus electrical or optical in the aircraft cabin, thereby increasing safety and reliability of the whole network.

The installation efforts of wirings, routes, connector interfaces, brackets for wiring installations and different data bus communication are reduced while only route segregation between high voltage AC power supply lines and hot busses that cannot be powered or shut down as other normal busses is necessary, thus leading to minimized installation weight and reduced troubleshooting action and troubleshooting time while maintaining the same or higher reliability of the overall network.

According to an embodiment of the power and data distribution module, the power and data distribution module may comprise a wireless transceiver coupled to the data concentrator, wherein the data concentrator is configured to receive redundant load shedding information via wireless data communication over the wireless transceiver.

According to a further embodiment of the power and data distribution module, the power and data distribution module may comprise a secondary power supply interface configured to be connected to other PADD modules, and a solid state power controller coupled to the secondary power supply interface, wherein the load shedding module is further configured to control the solid state power controller depending on the received load shedding information and the received redundant load shedding information.

According to a further embodiment of the power and data distribution module, the power and data distribution module may comprise a plurality of circuit breaking devices coupled between the power output interfaces and the voltage distribution modules, and a shedding control unit coupled to the load shedding module, the shedding control unit being configured to selectively activate or deactivate the circuit breaking devices depending on the received load shedding information and the received redundant load shedding information.

According to a further embodiment of the power and data distribution module, the first power supply interfaces may be configured to receive high-voltage AC power and lowvoltage DC power.

According to a further embodiment of the power and data distribution module, the secondary power supply interface may be configured to receive hot battery DC power.

According to a further embodiment of the power and data distribution module, the data bus interface may be configured to receive high speed cabin data.

According to a further embodiment of the power and data distribution module, the power and data distribution module may comprise an electrical energy storage device coupled to at least one of the plurality of power output interfaces and configured to temporarily store electrical energy to provide to one or more electrical loads coupled to the at least one of the plurality of power output interfaces.

According to a further embodiment of the power and data distribution module, the power and data distribution module may be an aircraft galley module or an aircraft lavatory module.

According to an embodiment of the power and data distribution network, the power and data distribution network may comprise a plurality of electrical energy supplies, and a plurality of electrical circuit breakers coupled to the plurality of electrical energy supplies and configured to selectively decouple the plurality of electrical energy supplies from the output of the electrical power distribution center.

According to a further embodiment of the power and data distribution network, the power and data distribution network may comprise an electrical network management controller configured to control the plurality of electrical circuit breakers.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
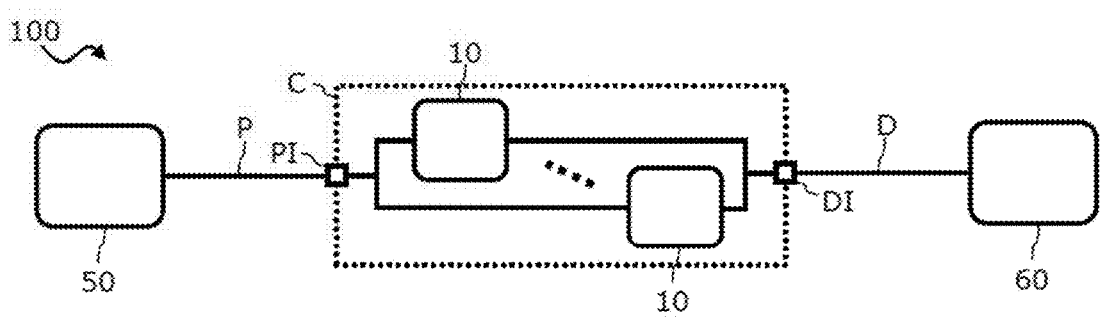
FIG. 1 schematically illustrates a power and data distribution network in an airborne vehicle according to an embodiment.

FIG. 1 shows a schematic illustration of a power and data distribution (PADD) network 100. The PADD network 100 may generally be employed in an airborne vehicle such as an aircraft or spacecraft. The PADD network 100 may also be employed in other vehicles such as ships, submarines, trucks, trains, space stations or satellites. FIG. 5 shows a schematic illustration of an exemplary aircraft 200 employing a PADD network, for example a PADD network 100 as shown and explained in conjunction with FIGS. 1 to 4.

The PADD network 100 comprises one or more electrical power distribution centers (EPDCs) 50 that supply one or more power supply lines P with electrical power. The EPDCs 50 may comprise electrical power supply for a main network and/or electrical power supply for an emergency network as well as a ground power connector. In an airborne vehicle, two EPDCs 50 may be provided for the left hand and right hand generator sides. The EPDCs 50 ensure the reliable and high qualitative generation of electrical power, the segregation and management of the distribution of the generated electrical power as well as the controlling and monitoring of the electrical network. Alternatively or additionally, it may also be possible to employ other types of DC or AC power sources in the airborne vehicle for supplying the PADD network 100 with electrical power. For example, the airborne vehicle may be equipped with decentralized and locally arranged power sources such as fuel cells, photovoltaic modules or similar power sources.

Figure 2:
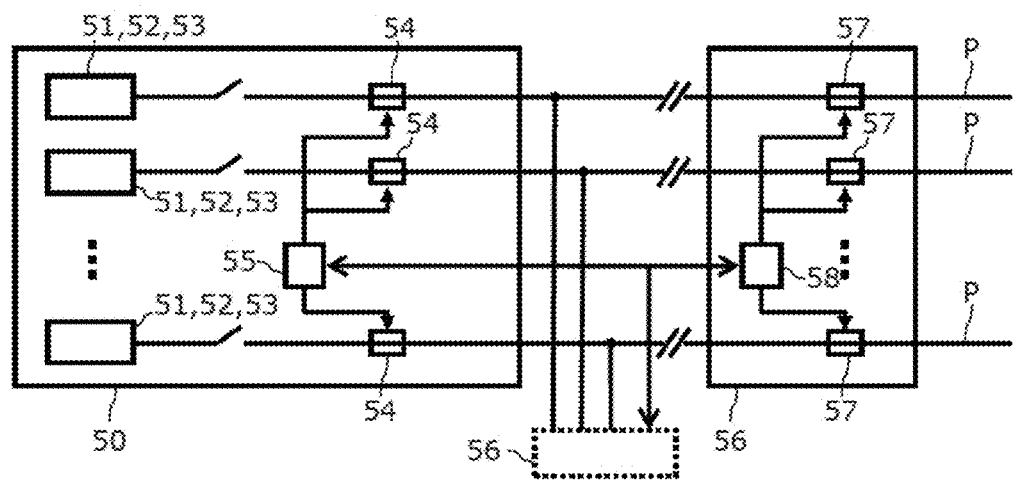
FIG. 2 schematically illustrates an electrical power distribution center for the power and data distribution network of FIG. 1.

FIG. 2 exemplarily shows an EPDC 50 as may be employed in the PADD network 100 of FIG. 1. The EPDC 50 may for example be an AC voltage EPDC 50 that comprises one or more electrical power supplies such as a variable frequency generator, a ram air turbine and/or an auxiliary generator. The electrical energy supplies, generally denoted as 51, 52, and 53, may operate under different normal and emergency conditions and supply electrical power for different needs. The electrical energy supplies 51, 52 and 53 may further be connected in supply groups that supply a common power line. Each of the electrical energy supplies 51, 52 and 53 or groups of electrical energy supplies may be equipped with a switch to selectively deactivate the power supply from the respective electrical energy supply 51, 52 or 53. The power lines may be coupled to a plurality of electrical circuit breakers in the respective separate power lines which are configured to selectively decouple the plurality of electrical energy supplies 51, 52, 53 from the output of the EPDC 50. This control may be effected by an electrical network management controller (ENMF) 55 which is configured to control the plurality of electrical circuit breakers 54.

The EPDC 50 may in particular be a 115 VAC power supply essential (ESS) operation, Extended Range Operations for Two-Engine Aeroplanes (ETOPS) operation, and emergency (EMER) condition cabin power (EEECP) cabin equipment which applies 115 VAC output power over two times three single protected remote controlled circuit breaker power lines, one for each left hand and right hand system side of an airborne vehicle. Two different routes are provided to fulfil the particular risk requirements, such as engine burst, hydraulic accumulator burst and the like. The EEECP cabin equipment is configured to only switch the relevant power supply line, if all connected PADD modules 10 transmit the shedding status from all linked from the same system side under the relevant power supply condition.

The ENMF 55 performs sheddings and reconfigures the PADD network 100 by configuration of the aircraft power demand and generation. The sheddings may in particular be dependent on the percentage of load on the remaining generators. For example, with one main generator in flight, the main AC bus bars of the opposite side will not be supplied and the ENMF 55 will shed loads based on power condition.

The EPDC 50 may provide for 28 VDC power supply. For example, four batteries may be connected to the 28 VDC power supply network to support no-break power transfer (NBPT) functionality in order to supply standby DC power and provide electrical power on ground. Two out of four batteries may supply the emergency network with the charging and protection functionality being integrated in each of the batteries. The 28 VDC power supply may be provided on two normal power supply lines or power bus bars and on two emergency power supply lines or power bus bars. The DC power bus bars may normally be supplied from respective 230 VAC bus bars, with rectifiers/transformers transforming and distributing the 28 VDC DC power supply over the emergency power bus bars. However, it should be evident that other bus bars with other voltage values may be equally applicable as well.

Downstream of the output bus bars of the EPDC 50 one or more remote control circuit breaker units 56 may be connected in parallel which each comprise a remote control circuit breaker controller 58 (shedding information may be distributed via a data over power (DOP) from ENMF 55) coupled to a plurality of remote control circuit breakers 57. The system power operation will be controlled by the remote control circuit breaker controller 58 for all necessary electrical configurations. The remote control circuit breaker controller 58 manages the power supply for AC power loads usage by shedding and reconnecting the power supply lines selectively via the remote control circuit breakers 57, if enough power is available. The remote control circuit breaker controller 58 may monitor any cabin loads coupled downstream of the EPDC 50 and supplied with electrical power by the EPDC 50. Such cabin loads may include inter alia seat power supply systems, galleys, lavatory, commercial equipment fans, cabin air extraction fans, cabin lighting, ice protection control unit waste/water heating systems, floor panel heating systems and in-flight entertainment systems.

The physical architecture of the electrical distribution may consist of two distinct EPDCs 50 in a PADD network that may be located in the nose fuselage of the airborne vehicle. One of the EPDCs 50 may be a 28 VDC cabin power supply powered alternately under normal, essential and hot battery conditions. The other EPDC 50 may be a 115 VAC cabin power supply powered alternately under normal, essential, extended range operations for two-engine aeroplanes (ETOPS) and emergency conditions.

Cabin equipment devices which shall apply a 28 VDC output power supply from the EPDC 50 acting as top line switching device are able to operate under essential and emergency conditions. The top line switching device may only be activated in emergency mode, as long as no command of the ENMF 55 overrides the control signals for the linked top line switching device. 28 VDC emergency functions may include passenger address, cabin interphone, emergency lighting, evacuation systems and smoke detection systems.

The EPDC 50 acting as 115 VAC power supply may supply power to operate essential and non-essential equipment under normal power supply conditions. In case of electrical essential condition, all non-essential loads will be shed, if the ENMF 55 sends an essential status configuration signal to the linked PADD modules 10. Similarly, the 115 VAC power supply may supply power to operate some systems or equipment under ETOPS condition. In case of electrical ETOPS condition, all non-ETOPS loads will be shed, if the ENMF 55 sends an ETOPS status configuration signal to the linked PADD modules 10. Finally, the 115 VAC power supply may supply power to operate some systems or equipment under emergency condition. In case of electrical emergency condition, all non-emergency loads will be shed, if the ENMF 55 sends an emergency status configuration signal to the linked PADD modules 10. Emergency functions for the cabin may inter alia include emergency lighting and oxygen containers.

The PADD network 100 of FIG. 1 further includes a data communication director 60 that is coupled to the plurality of PADD modules 10 via a data bus D. The data bus D may be a high speed data bus, such as a CAN bus of Ethernet bus. The data bus D may be hardwired between the data communication director 60 to the respective PADD modules 10. Additionally, redundant data transmission may be effected via a wireless data communication system.

The data bus D may be used for data communication with regard to bidirectional shedding information to be shared among the remote control circuit breaker controller 58, the ENMF 55 and communication units of the PADD modules 10. Similarly, the wireless data communication may be used as full data backup in case of data corruption on the hardwired data bus D.

Additionally, data with regard to bidirectional shedding information may be distributed via a data over power (DOP) communication protocol. The bidirectional DOP information may include a healthy protocol, the shedding status of relevant shedding groups, for example detailed failure status, as well as the emergency status of major systems, for example the status of oxygen cabin decompression. By distributing shedding information via DOP protocols, the shedding information may be made available for decentralized shedding of loads within the PADD modules 10. Monitoring and command signals for shedding information may be transmitted bidirectionally and crossover bidirectionally from the ENMF 55 to the PADD modules 10 as well as 58 and vice versa.

Figure 3:
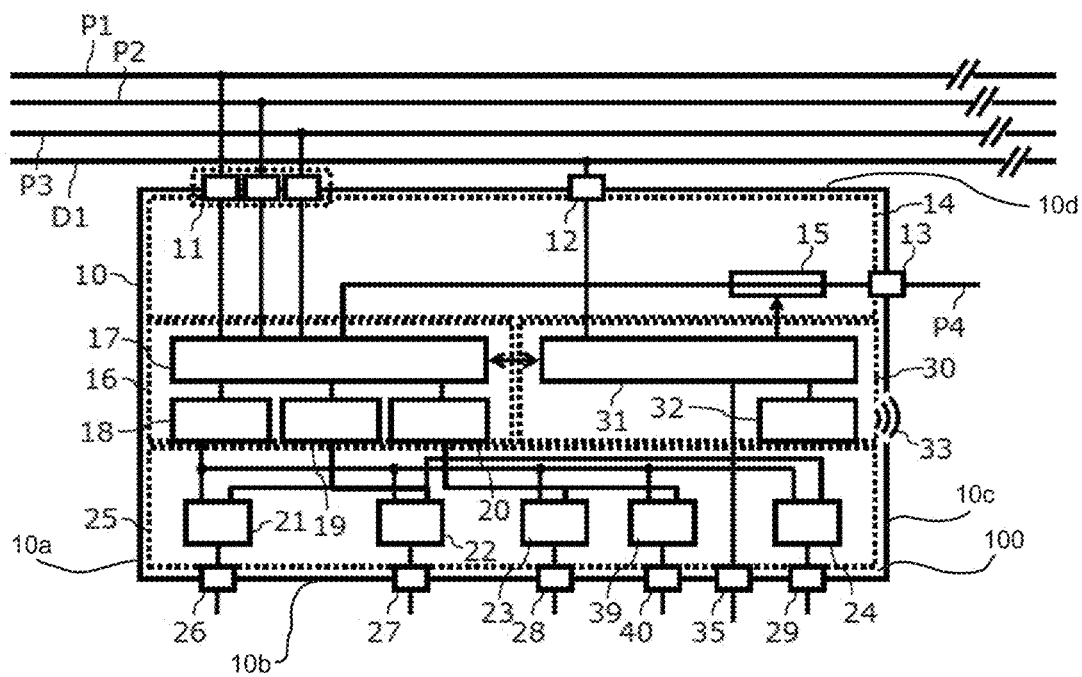
FIG. 3 schematically illustrates an exemplary power and data distribution module according to another embodiment.

FIG. 3 shows an exemplary illustration of a PADD module 10 that may be employed in a PADD network of an airborne vehicle, such as the PADD network 100 of FIG. 1. The PADD module 10 may comprise a plurality of boundaries 10*a*, 10*b*, 10*c*, 10*d* associated with one another to define a confined space 100. A plurality of first power supply interfaces 11, each configured to be connected to a plurality of power supply lines P1, P2 and P3, are associated with the boundary 10*d* in the illustrated embodiment. The power supply lines P1, P2 and P3 may for example be three phase power line of 115 VAC over which DOP shedding information may be distributed to the PADD module 10. The shedding information may for example be read out via a shedding transmission over power (STOP) interface of the PADD module 10.

The PADD module 10 may further comprise a data bus interface 12 configured to be connected to a data bus D1, particularly a high speed data bus D1, and associated with the boundary 10*d* in the illustrated embodiment. The PADD module 10 may be configured to supply electrical power from one of the first power supply interfaces 11 to electrical loads that are connected to a plurality of power output interfaces 26, 27, 28, 29 and 40 of the PADD module 10, associated with the boundary 10*b* in the illustrated embodiment. To distribute the electrical power a plurality of voltage distribution modules 19, 20 may be coupled between the plurality of first power supply interfaces 11 and the plurality of power output interfaces 26, 27, 28, 29 and 40 within the confined space 100. The distribution modules 19, 20 may be configured to provide AC or DC voltage by respective AC/DC or DC/DC converters.

The PADD module 10 may further comprise a load shedding module 17 as central load controlling unit within the confined space 100. The load shedding module 17 may for example be part of a primary power distribution module 16 within the PADD module 10 within the confined space 100. The load shedding module 17 may be configured to receive load shedding information via data communication over one or more of the plurality of power supply lines P1 to P3, specifically via the DOP communication protocol. At the same time, a data concentrator 31 of the PADD module within the confined space 100, may be configured to receive redundant load shedding information via data communication over the data bus D. The redundant load shedding information may be shared with the load shedding module 17 within the PADD module. The data concentrator 31 may in particular be part of a data distribution module 30 of the PADD module 10 within the confined space 100.

The load shedding module 17 is configured to shed one or more electrical loads connected to the plurality of power output interfaces 26 to 29 and 40 depending on the received load shedding information and the received redundant load shedding information. To provide even more redundant load shedding information to the PADD module 10, the PADD module 10 may comprise a wireless transceiver 32 which is coupled to the data concentrator 31. The data concentrator 31 may be configured to receive further redundant load shedding information via wireless data communication 33 over the wireless transceiver 32, to share with the load shedding module 17.

Optionally, the PADD module 10 may comprise at least one secondary power supply interface 13, associated with the boundary 10c, and configured to be connected to EPDC 50 provide 28 VDC power supply (under normal, essential and hot battery conditions) or a PADD control unit. The at least one secondary power supply interface 13 may also be configured to receive battery power or fuel cell power. The secondary power supply interface 13 is secure via a solid state power controller 15, within the confined space 100, as part of a secondary power distribution module (SPDM) 14, within the confined space 100, coupled to the secondary power supply interface 13 that may be controlled by the load shedding module 17 depending on the various load shedding information.

The at least one secondary power supply interface 13 is generally connectable to centralized or decentralized power sources such as centralized or decentralized and locally arranged fuel cells in the airborne vehicle.

The PADD module 10 further comprises a plurality of circuit breaking devices 21, 22, 23, 24 and 39, within the confined space 100 and coupled between respective ones of the power output interfaces 26 to 29 and 40 and the voltage distribution modules 19 and 20. A shedding control unit 18 under control of the load shedding module 17 may be configured to selectively activate or deactivate the circuit breaking devices 21 to 24 and 39 depending on the received load shedding information and the received redundant load shedding information.

The basic functionality of the PADD module 10 is power Distribution (AC and DC), voltage transformation, shedding based on ENMF and STOP control signals and data communication via a linked high speed data bus and wireless data communication. Moreover, the PADD module 10 may provide power overload protection for the connected electrical loads.

All the different power supply categories are individually protected via circuit breaking devices 21 to 24 and 39 such as RCCBs or SSPCs. Those protection devices are monitored and controlled in real-time in order to realize local and global safety criticality. The monitoring and controlling information is redundantly communicated via DOP communication protocol the high speed data bus as well as wireless data transmission, thereby enabling the system to recognize jamming attacks or disturbances of other transmitters reliably.

The PADD module 10 may be implemented as an aircraft lavatory module, including fault current detection for shower use case functions in order to protect passengers and maintenance personnel from high voltages. This may be realized via a module internal grounding and bonding network. The PADD module 10 may also be implemented in a galley module of an aircraft, being equipped with additional fault current detection for bar use case functions, in order to protect passengers, cabin crew and maintenance personnel from high voltages. This may be realized via a module internal grounding and bonding network.

Figure 4:
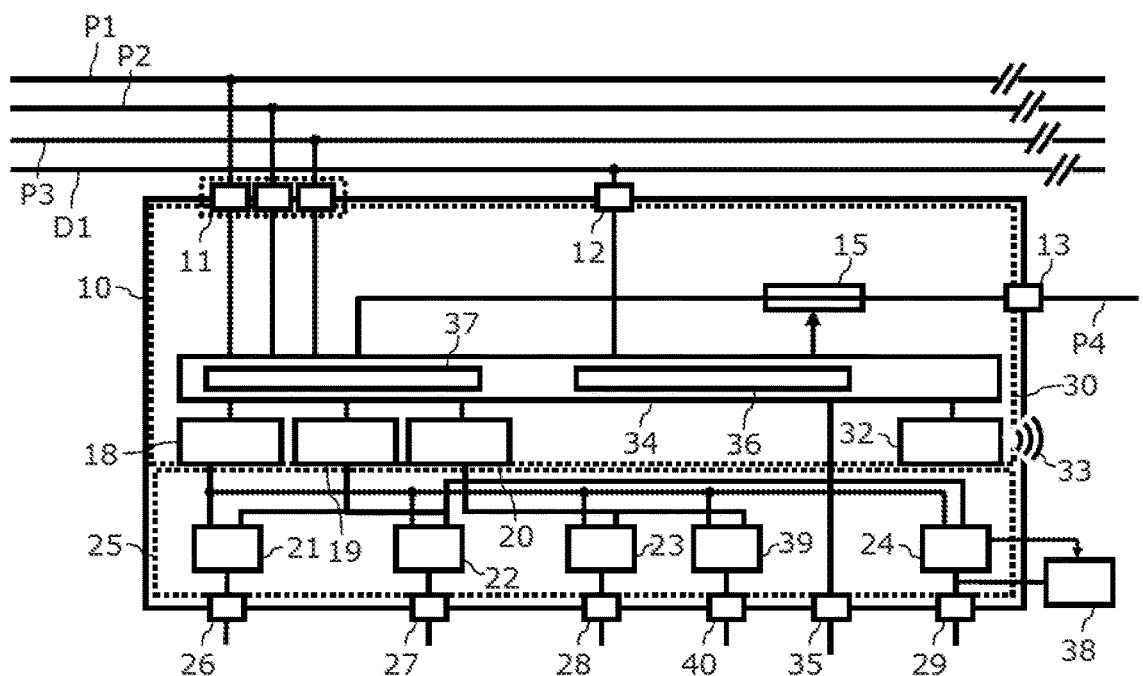
FIG. 4 schematically illustrates a further exemplary power and data distribution module according to another embodiment.
Figure 5:
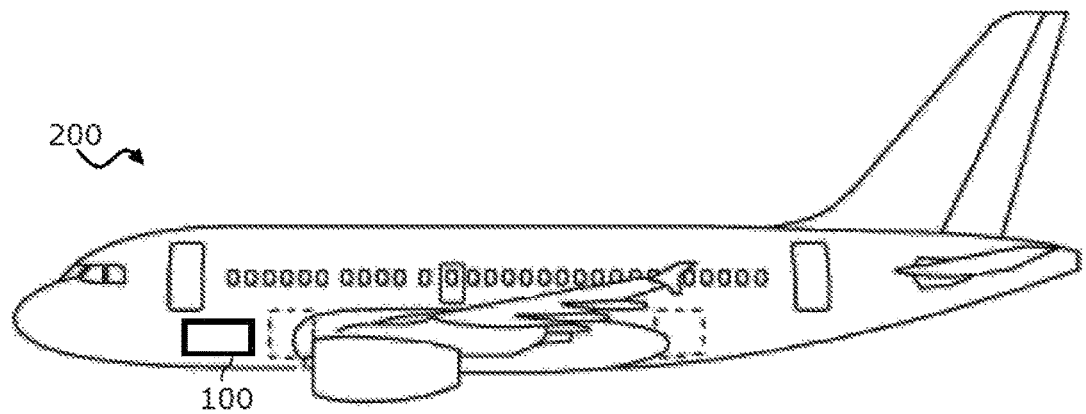
FIG. 5 schematically illustrates an airborne vehicle having a power and data distribution network according to another embodiment.

FIG. 4 shows an illustration of an alternative implementation of a PADD module 10. The PADD module 10 of FIG. 4 may comprise a single data distribution module 30 which in turn includes a combined primary power and data distribution module 34 with a data concentrator 36 and a load shedding module 37. Moreover, the PADD module 10 may be connected with an electrical energy storage device 38 that is connected to one of the power supply outputs 29 of the PADD module 10. In order to save hot battery bus implementations the electrical energy storage device 38 may for example be a quantum super capacitor that may additionally and temporarily supply emergency lighting via the power supply output interface 29.

Figure 6:
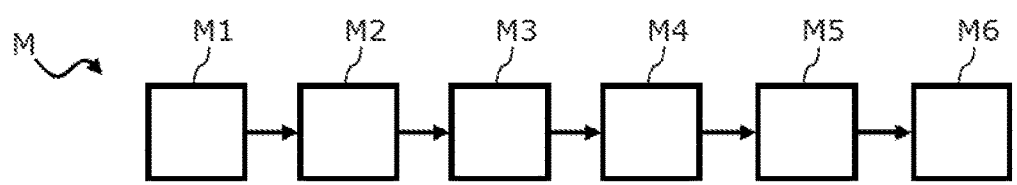
FIG. 6 schematically illustrates a method for power and data distribution in an airborne vehicle according to another embodiment.

FIG. 6 exemplarily illustrates a method M for power and data distribution in an airborne vehicle such as the airborne vehicle 200 of FIG. 5, in particular using a PADD network 100 as illustrated in conjunction with FIGS. 1 to 4. The method M may comprise at M1 generating electrical power in at least one electrical power distribution center 50 or any other suitable power source within the airborne vehicle. At M2, the generated electrical power may be distributed via one or more power supply lines to a plurality of PADD modules 10, which receive, at M3, load shedding information via data communication over one or more of the plurality of power supply lines. At the same time, at M4, redundant load shedding information may be received at the plurality of PADD modules 10 via data communication over a data bus. The redundant load shedding information may be transmitted in the plurality of PADD modules 10 to a load shedding module in the PADD modules 10 at M5. These load shedding modules may then, at M6, and shed one or more electrical loads connected to power output interfaces of the PADD modules 10 depending on the received load shedding information and the received redundant load shedding information.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

LIST OF REFERENCE NUMERALS AND SIGNS

10 Power and data distribution module
11 Power supply interfaces
12 Data bus interface
13 Secondary power supply interface
14 Secondary power distribution module
15 Solid state power controller
16 Primary power distribution module
17 Load shedding module
18 Shedding control unit
19 DC voltage distribution module
20 AC voltage distribution module
21 Circuit breaking electronics
22 Circuit breaking electronics
23 Circuit breaking electronics
24 Circuit breaking electronics
25 Shedding electronics
26 DC voltage output interface
27 DC voltage output interface 28 AC voltage output interface
29 DC voltage output interface
30 Data distribution module
31 Data concentrator
32 Wireless transceiver
33 Wireless data transmission
34 Combined primary power and data distribution module
35 Data output interface
36 Data concentrator
37 Load shedding module
38 Electrical energy storage device
39 Circuit breaking electronics
40 AC voltage output interface
50 Electrical power distribution center
51 Electrical energy supply
52 Electrical energy supply
53 Electrical energy supply
54 Electrical circuit breaker
55 Electrical network management controller
56 Remote control circuit breaker unit
57 Remote control circuit breaker
58 Remote control circuit breaker controller
60 Data communication director
100 Power and data distribution network
200 Aircraft
C Cabin area
D Data bus
DI Data bus interface
D1 Data bus
M Method
M1 Method step
M2 Method step
M3 Method step
M4 Method step
M5 Method step
M6 Method step
P Power line
PI Power line
P1 Power line
P2 Power line
P3 Power line
P4 Power line While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A power and data distribution (PADD) module, comprising:
 a plurality of boundaries associated with one another to define a confined space;
 a plurality of first A.C. power supply interfaces associated with one of the plurality of boundaries, each configured to be connected to a plurality of A.C. power supply lines;
 a data bus interface configured to be connected to a data bus and associated with one of the plurality of the boundaries;
 a plurality of power output interfaces associated with one of the plurality of boundaries, each configured to be connected to one or more electrical loads and to supply electrical power from one of the plurality of first A.C. power supply interfaces to the one or more electrical loads;
 a plurality of voltage distribution modules coupled between the plurality of first A.C. power supply interfaces and the plurality of power output interfaces and configured to provide AC or DC voltage via the plurality of power output interfaces and located within the confined space;
 a load shedding module located within the confined space and configured to receive load shedding information via data communication over one or more of the plurality of A.C. power supply lines, the load shedding module being arranged between and in electrical communication with each of the plurality of first A.C. power supply interfaces and the plurality of voltage distribution modules; and
 a data concentrator located within the confined space and configured to receive redundant load shedding information via data communication over the data bus and to transmit the redundant load shedding information to the load shedding module,
 the load shedding module being further configured to shed one or more of the one or more electrical loads connected to the plurality of power output interfaces depending on the received load shedding information and the received redundant load shedding information.

2. The PADD module of claim 1, further comprising:
 a wireless transceiver coupled to the data concentrator;
 the data concentrator being configured to receive redundant load shedding information via wireless data communication over the wireless transceiver.

3. The PADD module of claim 1, further comprising:
 at least one secondary power supply interface configured to be connected to other PADD modules; and
 a solid state power controller coupled to the at least one secondary power supply interface,
 the load shedding module being further configured to control the solid state power controller depending on the received load shedding information and the received redundant load shedding information.

4. The PADD module of claim 1, further comprising:
 a plurality of circuit breaking devices coupled between the plurality of power output interfaces and the plurality of voltage distribution modules; and
 a shedding control unit coupled to the load shedding module, the shedding control unit being configured to selectively activate or deactivate the plurality of circuit breaking devices depending on the received load shedding information and the received redundant load shedding information.

5. The PADD module of claim 3, wherein the at least one secondary power supply interface is configured to receive hot battery DC power, battery power or fuel cell power.

6. The PADD module of claim 4, wherein the at least one secondary power supply interface is connectable to centralized or decentralized power sources.

7. The PADD module of claim 6, wherein the at least one secondary power supply interface is connectable to one or more decentralized fuel cells.

8. The PADD module of claim 1, wherein the data bus interface is configured to receive high speed cabin data.

9. The PADD module of claim 1, further comprising:
an electrical energy storage device coupled to at least one of the plurality of power output interfaces and configured to temporarily store electrical energy to provide to one or more electrical loads coupled to the at least one of the plurality of power output interfaces.

10. The PADD module of claim 1, wherein the PADD module is an aircraft galley module, an aircraft lavatory module, or a decentralized aircraft module.

11. A power and data distribution (PADD) network, comprising:
a plurality of PADD modules, each of the plurality of PADD modules comprising:
 a plurality of boundaries associated with one another to define a confined space;
 a plurality of first A.C. power supply interfaces associated with one of the plurality of boundaries, each configured to be connected to a plurality of A.C. power supply lines;
 a data bus interface configured to be connected to a data bus and associated with one of the plurality of boundaries;
 a plurality of power output interfaces associated with one of the plurality of boundaries, each configured to be connected to one or more electrical loads and to supply electrical power from one of the plurality of first A.C. power supply interfaces to the one or more electrical loads;
 a plurality of voltage distribution modules coupled between the plurality of first A.C. power supply interfaces and the plurality of power output interfaces and configured to provide AC or DC voltage via the plurality of power output interfaces and located within the confined space;
 a load shedding module located within the confined space and configured to receive load shedding information via data communication over one or more of the plurality of A.C. power supply lines, the load shedding module being arranged between and in electrical communication with each of the plurality of first A.C. power supply interfaces and the plurality of voltage distribution modules; and
 a data concentrator located within the confined space and configured to receive redundant load shedding information via data communication over the data bus and to transmit the redundant load shedding information to the load shedding module,
the load shedding module being further configured to shed one or more of the one or more electrical loads connected to the plurality of power output interfaces depending on the received load shedding information and the received redundant load shedding information;
at least one electrical power distribution center coupled to the plurality of PADD modules via one or more of the plurality of first A.C. power supply interfaces; and
a data communication director coupled to the plurality of PADD modules via the data bus interface.

12. The PADD network of claim 11, wherein the at least one electrical power distribution center comprises:
 a plurality of electrical energy supplies; and
 a plurality of electrical circuit breakers coupled to the plurality of electrical energy supplies and configured to selectively decouple the plurality of electrical energy supplies from the output of the at least one electrical power distribution center or other power sources such as a fuel cell.

13. The PADD network of claim 12, further comprising:
an electrical network management controller configured to control the plurality of electrical circuit breakers.

14. A method for power and data distribution (PADD) in an airborne vehicle, the method comprising:
 generating electrical power in at least one electrical power distribution center or a decentralized power source in the airborne vehicle;
 distributing the generated electrical power via one or more power supply lines to a plurality of PADD modules, each of the plurality of PADD modules comprising a plurality of boundaries associated with one another to define a confined space;
 receiving load shedding information at at least one of the plurality of PADD modules via data communication over one or more of the one or more of power supply lines via a plurality of A.C. power supply interfaces of the at least one of the plurality of PADD modules, the plurality of A.C. power supply interfaces associated with one of the plurality of boundaries of the at least one of the plurality of PADD modules;
 receiving redundant load shedding information at at least one of the plurality of PADD modules via data communication over a data bus;
 transmitting the redundant load shedding information in the at least one of the plurality of PADD modules to a load shedding module of the at least one of the plurality of PADD modules, the load shedding module located within the confined space of the at least one of the plurality of PADD modules; and
 shedding one or more electrical loads connected to power output interfaces of the at least one of the plurality of PADD modules depending on the received load shedding information and the received redundant load shedding information, the power output interfaces associated with one of the plurality of boundaries of the at least one of the plurality of PADD modules,
wherein each of the load shedding module is arranged between and in electrical communication with each of the plurality of A.C. power supply interfaces and a plurality of voltage distribution modules of corresponding one of the plurality of PADD modules, within the confined space of corresponding one of the plurality of PADD modules.

* * * * *